(12) United States Patent
Bashkin

(10) Patent No.: US 9,098,825 B2
(45) Date of Patent: Aug. 4, 2015

(54) STORAGE CONTAINER WITH INVENTORY CONTROL

(71) Applicant: Leonard M. Bashkin, Cleveland, OH (US)

(72) Inventor: Leonard M. Bashkin, Cleveland, OH (US)

(73) Assignee: Leonard Bashkin, Cleveland, OH (US)

( * ) Notice: Subject to any disclaimer, the term of this patent is extended or adjusted under 35 U.S.C. 154(b) by 0 days.

(21) Appl. No.: 14/036,012

(22) Filed: Sep. 25, 2013

(65) Prior Publication Data

US 2014/0297487 A1 Oct. 2, 2014

Related U.S. Application Data

(60) Provisional application No. 61/805,350, filed on Mar. 26, 2013.

(51) Int. Cl.
*G06Q 10/00* (2012.01)
*G06Q 10/08* (2012.01)

(52) U.S. Cl.
CPC .................. *G06Q 10/087* (2013.01)

(58) Field of Classification Search
CPC .............. G06Q 10/087; G11B 33/08
USPC ..................... 705/28; 720/639, 657
See application file for complete search history.

(56) References Cited

U.S. PATENT DOCUMENTS

| | | | |
|---|---|---|---|
| 5,905,653 A * | 5/1999 | Higham et al. ............... | 700/244 |
| 6,694,221 B2 | 2/2004 | Chavez et al. | |
| 7,092,789 B2 | 8/2006 | Chavez et al. | |
| 2002/0118111 A1* | 8/2002 | Brown et al. ................. | 340/540 |
| 2007/0215238 A1* | 9/2007 | Ruikka et al. .................. | 141/83 |
| 2008/0044001 A1* | 2/2008 | Kim et al. ................ | 379/428.02 |
| 2009/0072029 A1* | 3/2009 | Martin .......................... | 235/385 |
| 2009/0121017 A1* | 5/2009 | Cato et al. ..................... | 235/385 |
| 2010/0045423 A1* | 2/2010 | Glickman et al. .............. | 705/28 |
| 2010/0106625 A1* | 4/2010 | McCoy .......................... | 705/28 |
| 2011/0178630 A1* | 7/2011 | Green et al. .................. | 700/214 |
| 2012/0130534 A1* | 5/2012 | Wurm .......................... | 700/236 |
| 2012/0200385 A1* | 8/2012 | Savage et al. ................. | 340/5.7 |
| 2013/0070090 A1* | 3/2013 | Bufalini et al. ................ | 348/61 |
| 2013/0282392 A1* | 10/2013 | Wurm .............................. | 705/2 |
| 2013/0332323 A1* | 12/2013 | Phillips et al. ................. | 705/28 |
| 2014/0168396 A1* | 6/2014 | Kempiak et al. ............... | 348/61 |

FOREIGN PATENT DOCUMENTS

| | | |
|---|---|---|
| EP | 1068598 | 1/2001 |
| EP | 2363831 | 7/2011 |
| WO | 2005084237 | 9/2005 |

* cited by examiner

*Primary Examiner* — Hunter Wilder

(74) *Attorney, Agent, or Firm* — Hahn Loeser & Parks LLP; Carlos P. Garritano

(57) ABSTRACT

Systems and methods of the invention relate to managing an inventory of items within a storage container. A storage container can house one or more items for distribution among one or more users such as, for instance, employees. The storage container discussed herein provides authentication of a user, tracking of the inventory each user removes or returns, video/image capture of user during access of the storage container, wireless tracking of items housed within the storage container, among others.

20 Claims, 7 Drawing Sheets

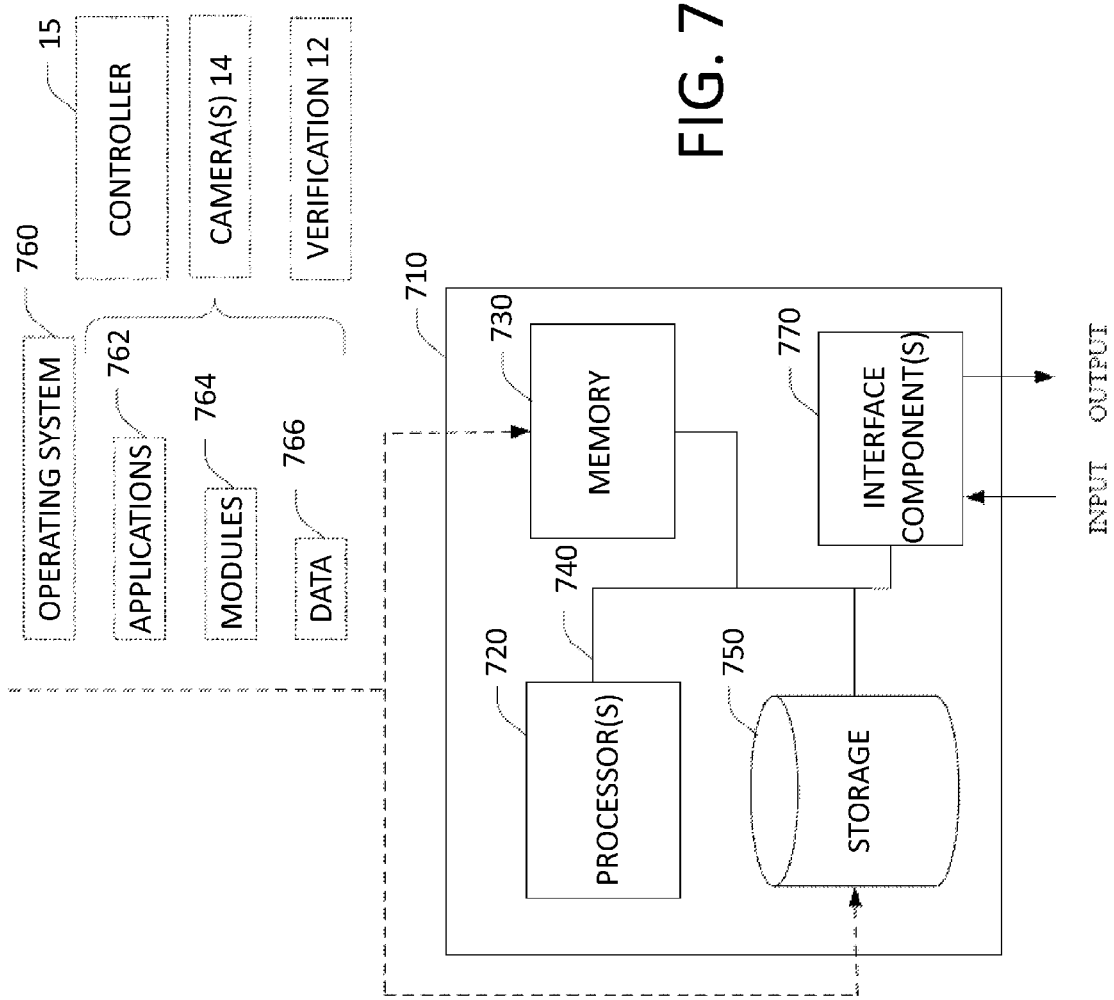

STORAGE CONTAINER WITH INVENTORY CONTROL

CROSS-REFERENCE TO RELATED APPLICATIONS

This non-provisional application claims the benefit of U.S. Provisional Application Ser. No. 61/805,350, filed Mar. 26, 2013, and entitled "STORAGE CONTAINER WITH INVENTORY CONTROL." The entirety of the aforementioned application is incorporated herein by reference.

BACKGROUND

1. Technical Field

Embodiments of the subject matter disclosed herein relate generally to systems and methods for inventory management in an environment, and more specifically, relate to a powered storage container for managing inventory items.

2. Discussion of Art

A variety of professional and other environments rely on a diverse assortment of inventory. From pens and pencils, which may be stocked in the hundreds, to expensive or specialized electronic equipment shared between a group of workers, it is important for organizations or even individuals to track and evaluate supplies or equipment. Traditionally, supplies are kept in open areas, where anyone may remove or utilize them, or secured areas, which require a specific person to control access. In open areas, easy access to supplies may encourage their misuse or loss, increasing costs and the burden of managing supplies. In secure areas, key personnel who frequently access inventory may be inconvenienced, inventory may not be immediately available as-needed, and additional personnel is required to control access. An alternative arrangement can be for individuals to seek their own supply, which is less efficient than ordering in bulk for a group, and either encumbers individuals with the expense of furnishing their respective inventory items at retail cost or creates additional paperwork and effort for reimbursement.

Existing technologies attempting to automate such management are complex and expensive. They typically rely on expensive or custom hardware and software, are error-prone, and are frequently limited to specific areas and difficult to move. Further, existing systems do not positively identify each user, which limits the resolution of inventory management data and increases the likelihood of misuse or abuse by individuals. In addition, existing systems are complex and cumbersome, and as a result access to inventory is tedious, frustrating, and wasteful.

Accordingly, it may be desirable to have systems or methods for managing an inventory that differs from those systems and methods that are currently available, for example, to reduce cost, improve ease of use, affirmatively identify users interacting with inventory, increase system flexibility after deployment, and decrease the time required to access, remove, or replenish inventory properly. Such examples are non-exhaustive and non-limiting, and the systems and methods described herein will include other benefits and possess other motivations than those expressly listed.

BRIEF DESCRIPTION

In an embodiment, a system is provided that includes a storage container that houses a first item and a second item, wherein the first item includes a first amount and a second item includes a second amount and the first item and the second item are non-medical related. In the embodiment, the inventory system can further include a verification component that is configured to receive a portion of data from a user and a lock mechanism for the storage container that secures an access thereto based upon the portion of data from the user. The inventory system further includes a camera system that provides a first camera focused on the user and a second camera focused on at least one of the first item or the second item. In an embodiment, the system can include at least four (4) cameras in which one camera is positioned and focused on the user accessing the storage container and the three (3) cameras are focused on sections of the storage container that includes items (e.g., on each shelf, among others), and all user motions around those items.

In the embodiment, the inventory system can include a controller component that is configured to record media from the first camera and the second camera upon verification of the portion of data from the user and a wireless scanning device that provides a scan of a portion of the first item or a portion of the second item to indicate a removal from the storage container. The controller component monitors at least one of the first amount of the first item or the second amount of the second item based on at least one of the scans or recorded media and the controller component stores at least one of the portion of data, the scan, or the recorded media.

BRIEF DESCRIPTION OF THE DRAWINGS

Reference is made to the accompanying drawings in which particular embodiments and further benefits of the invention are illustrated as described in more detail in the description below, in which:

FIG. 7 is an illustration of a block diagram of a computing environment for use herewith.

DETAILED DESCRIPTION

Figure 1:
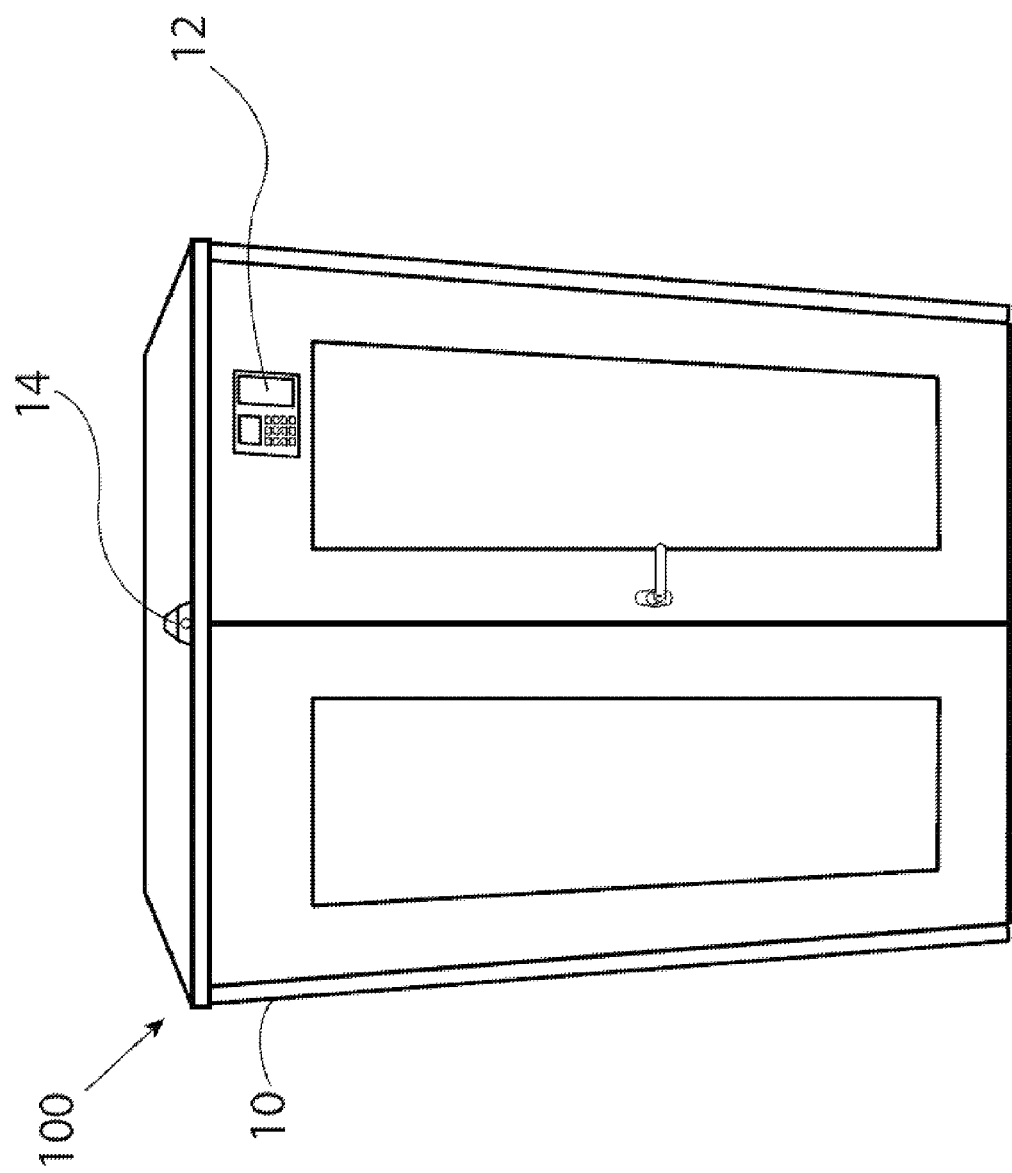
FIG. 1 is an illustration of an embodiment of a system for managing an inventory of items for an environment.

Embodiments of the invention relate to methods and systems for managing an inventory of items within a storage container, wherein the inventory of items are non-medical related. A storage container can house one or more items for distribution among one or more users (e.g., employees, members, students, volunteers, contractors, and others). The storage container discussed herein provides authentication of a user, tracking of inventory that each user removes or returns, video/image capture of user during access of the storage container, wireless tracking of items housed within the storage container, among others. The storage container can provide management of items within an environment by tracking each user and items consumed, used, removed, and/or returned. In addition, the storage container and/or interfaces associated therewith can enable users (e.g., administrators) to add or remove items of the environment from the container to effect detailed, accurate tracking of particular items and dynamically manage inventory control efforts.

With reference to the drawings, like reference numerals designate identical or corresponding parts throughout the several views. However, the inclusion of like elements in different views does not mean a given embodiment necessarily includes such elements or that all embodiments of the invention include such elements.

The term "component" as used herein can be defined as a portion of hardware, a portion of software, or a combination thereof. A portion of hardware can include at least a processor and a portion of memory, wherein the memory includes an instruction to execute. The term "component" can further include a controller programmed to perform a function, step, or methodology as described herein.

The term "storage container" or "container" as used herein can be defined as a mechanical device that defines a volume, at least partially surrounded by the device, wherein the volume can house one or more items. In particular, the storage container or container can include an opening that allows a user to retrieve one or more items housed therein. Moreover, the storage container can house the items and such storage container may be secured/unsecured, open/closed, locked/unlocked, et cetera, thereafter.

As used herein, an "inventory" can be one or more items capable of being at least partially controlled by systems or methods disclosed herein. While the concept of "inventory" lends itself to boxes of pens or sheets of paper, it will be understood on review of the disclosures herein that an inventory can be a single item (e.g., a computer, a piece of scientific equipment, a camera, sensitive print information, a piece of manufacturing equipment), a plurality of items (e.g., paperclips, batteries, manufacturing components, repair parts), and/or combinations thereof. In embodiments, only a portion or related aspect of an inventory is stored in a container described herein. For example, one set of items controlled by a container herein can be keys for one or more vehicles. Thus, a vehicle inventory can be managed by aspects herein, although the vehicles themselves are not stored in the container. In another embodiment, a large piece of equipment can be partially secured using devices in here, and cannot be used or moved without unlocking, despite the fact that physical contact with at least a portion of the equipment is possible before it is released by the container. These aspects are provided for illustrative purposes only, and are not intended to prohibit the use of larger containers (e.g., sufficient to contain an automobile) with aspects herein. For example, a shipping container or secure room can be configured with aspects herein to maintain larger items in its volume. While "inventory" can be used to indicate a collective plural, it may also be used herein to indicate a particular item or items. "Inventory item" or similar terminology can refer to one or more of a specific item within an inventory. Unless specifically indicated otherwise, such language may be used interchangeably in instances.

Further, while aspects herein are generally directed toward a workplace environment and an inventory of supplies or equipment associated with an office, no example given or inference drawn should be deemed to limit application of the techniques herein to a particular environment. The container may be used in a variety of indoor or outdoor settings, and, in embodiments, may be ruggedized or include hermetic seals to withstand environmental conditions or hazards associated with use in a particular environment.

Systems and methods herein can be designed to track internal inventory for customers who currently use earlier vending machines at less than half the cost of existing systems. Low-cost components can be integrated and flexible systems provided to avoid the expense of custom solutions.

Systems and methods herein can further include biometric or other positive user authentication. Video recording adds an additional level of accurate monitoring. By carefully identifying each and every user interacting with an inventory control system, users are motivated to use the system properly and properly manage organizational resources.

Hardware and software used with aspects disclosed herein can additionally be integrated end-to-end through an organization. Network, hardware, and software compatibility between components permits devices to "talk to" one another, as well as communicate with other devices.

Despite the capability of systems and methods herein to interact remotely, aspects herein are configured to function without Internet access. By avoiding a connectivity requirement to use, aspects herein are made more robust and flexible than a system that only functions with Internet access.

Systems and methods herein also dramatically increase the speed and efficiency of inventory access and management from the user perspective. Authentication, opening, removal, and closing of inventory management systems herein can take less than 15 seconds, whereas existing solutions often require dramatically more time to utilize.

Figure 2:
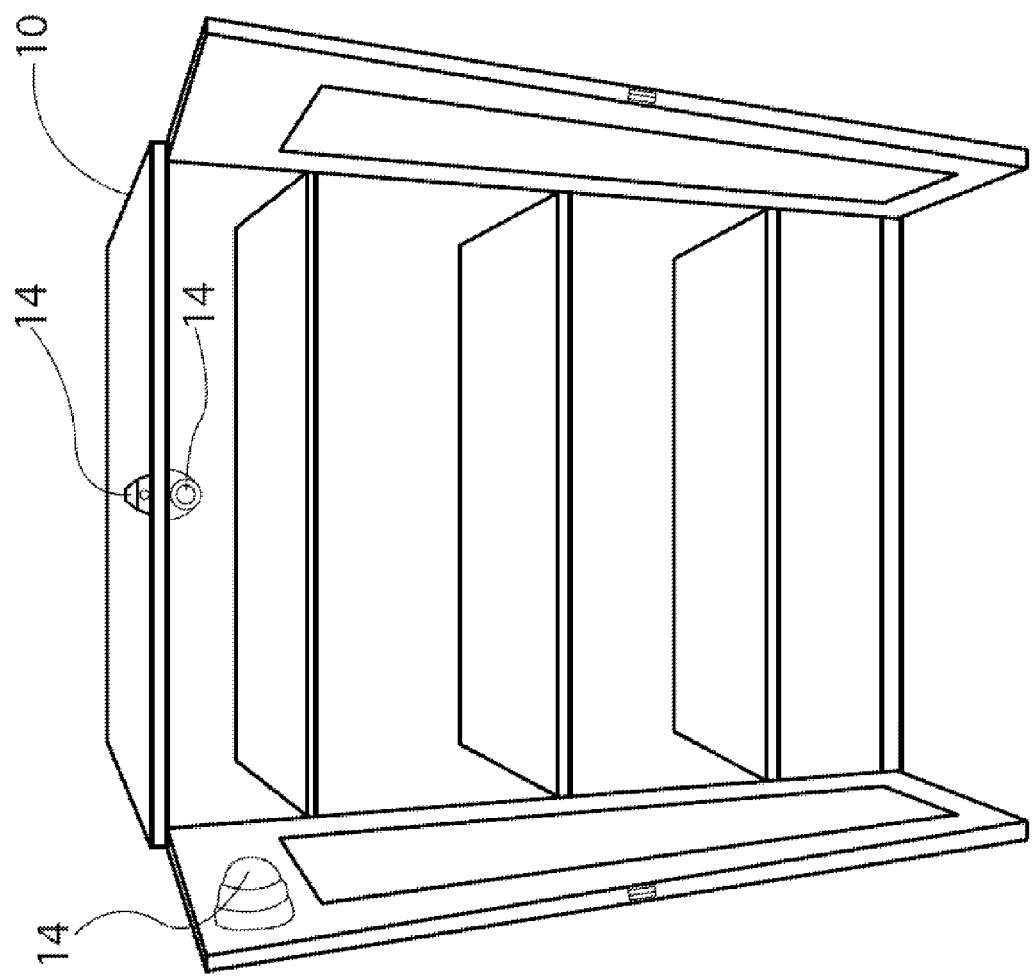
FIG. 2 is an illustration of an embodiment of a system for managing an inventory of items for an environment.
Figure 3:
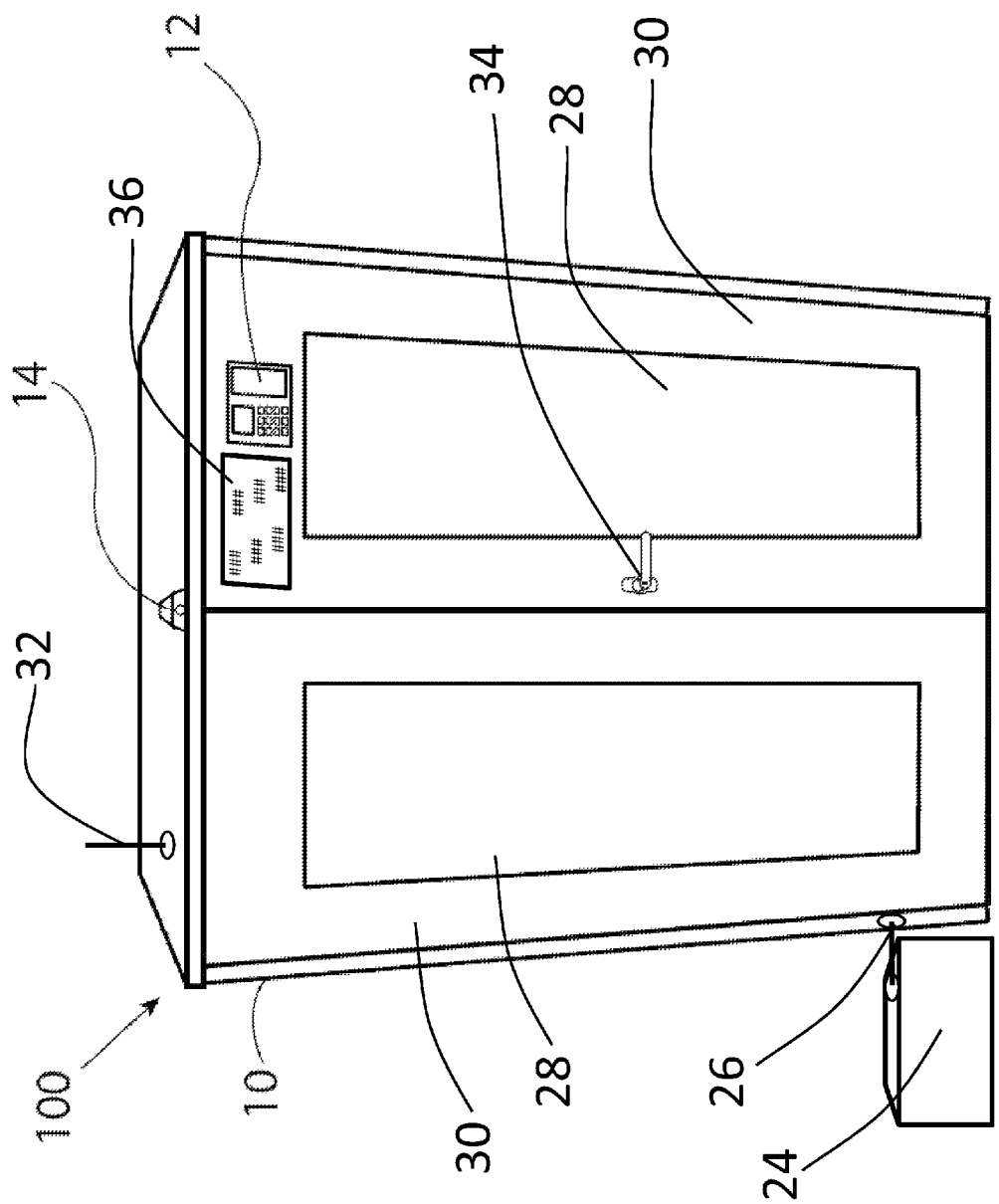
FIG. 3 is an illustration of an embodiment of a system for managing an inventory of items for an environment.

FIG. 1 is an illustration of a system 100 (also referred to as an inventory system) for managing items housed within a storage container 10. FIGS. 1-3 illustrate the storage container 10 and various embodiments of the system 100. In particular, FIG. 1 illustrates the storage container 10 in a closed state (e.g., no access to the internal housing of items) and FIG. 2 illustrates the storage container 10 in an open state (e.g., access to the internal housing of items). The storage container 10 houses one or more items. It is to be appreciated that the items can be any suitable item or good that is used within an environment. For instance, in an office work environment, the item can be an office supply such as, but not limited to, a pen, a ruler, tape, compact disks, DVD's, among others. In another example, the environment can be an industrial work environment, wherein the item can be a tool, a pair of gloves, safety goggles, among others. It is to be appreciated that the subject innovation is intended to include any suitable item that is to be managed and/or tracked to optimize consumption of such item.

The storage container 10 further includes a verification component 12. The verification component 12 is configured to receive a portion of data from a user as input to determine whether the user is allowed access to the storage container and/or inside of the storage container 10 that houses items. In an example, the system 100 can utilize a lookup data table that includes corresponding portions of data for each registered user that has access to the storage container 10. Thus, if a portion of data is received by the verification component 12 and is contained within the lookup table (e.g., corresponding to a user based on a prior registration), the user is allowed access. It is to be appreciated that registration for a user can be employed in various manners and registration techniques are intended to be included with this application.

For instance, a user can access the storage container 10 via the verification component 12 that is configured to receive a portion of data from the user. The portion of data can be, but is not limited to, a portion of biometric data, a code, a number, a letter, a barcode, a proximity sensor via wireless data transfer (e.g., Radio Frequency Identification (RFID), Near Field Communication (NFC), wireless communication via a transmitter and a receiver, among others), a keypad entry, an identification badge, a security badge, among others. By way of example, the biometric data can be a handprint, a fingerprint, a retinal scan of an eye, a portion of facial data of the operator, a height of the operator, a weight of the operator, body-shape of the operator, capacitance of operator based on body-mass index, among others. By way of example, the portion of data can further be, but is not limited to, a username, a password, employee identification, image identification, or a combination thereof. For example, the image identification can be a barcode, a Quick Response (QR) code, a portion of a graphic, a logo, a three-dimensional (3D) barcode, among others.

Embodiments herein can utilize a multi-factor authentication employing two or more verification techniques to access one or more portions of container 10. For example, entered data, biometric data, and other information can be evaluated in combination to complete verification.

Upon verification, the user can be allowed access to the storage container. In a particular example, a lock mechanism 18 is released or engaged based upon whether or not a user is authorized or verified. For instance, a lock mechanism 18 can be a magnetic based lock that is released upon verification of a user to allow access to the storage container. Lock mechanism 18 can be an electronic lock, or a lock with mechanical components that are controlled by associated electronic components. For example, a user is verified by the verification component 12 prior as having access to inside the storage container 10 by, for instance, a thumbprint. Once verified, the storage container 10 allows access to the housed items by releasing or disengaging the lock mechanism 18. As discussed in more detail below, the verification can also activate one or more cameras 14 (also referred to as camera system and/or first camera, second camera, and the like).

The system 100 can further include a first camera focused on the user when opening or accessing the items and a second camera focused on the items housed within the storage container 10. The system 100 can include a controller component 15 that is configured to initiate recording or data collection from the cameras 14 based upon at least one of a verification of the user via the verification component 12 or an unlocking of the lock mechanism 18 based upon approval of the user. In another example, the controller component 15 can initiate recording or data collection based on motion sensing. It is to be appreciated that the controller component 15 can manage the lock mechanism 18 based on the verification component 12, (e.g., access to the storage container 10) as well as, management of tracking items removed or returned to the storage container 10.

In a particular embodiment, the inventory system 100 can include a storage container 10 with shelves at a top position, a middle position, and a lower position respectively. While the illustrated embodiment shows three shelves, any number of shelves can be included. Each shelf can include at least one corresponding camera to capture the area with image or video, in addition to the camera capturing media of the user. Thus, the user is monitored during the interaction with the storage container 10 to identify any removal or return of items to or from the storage container 10. The cameras 14 can collect media (e.g., images, video, and the like) to capture the user and the items as the items are returned or removed from the storage container 10. It is to be appreciated that any suitable number of shelves and/or cameras can be employed with the subject innovation.

In an embodiment, the cameras 14 can be installed inside the storage container 10 such that at least one camera is focused on the user accessing the storage container 10 and one or more cameras are focused on items within the storage container 10 (to track removal or returning). Additionally, the cameras 14 can be remotely controlled to move focus and/or aim to a different location.

In another embodiment, the cameras 14 can be attached to one or more doors (e.g., on the inside of the doors) of the storage container 10, wherein the doors can be limited with motion as to ensure the cameras 14 are focused on at least one of the items in the storage container 10 and/or the user opening or accessing the storage container 10.

The system 100 can further include a scanner 16 (e.g., wireless or hard-wired, also referred to as a scanning device) which is contained or placed within the storage container 10. A user, upon verification and access to the storage container 10 via verification component 12, can utilize the scanner 16 to indicate which items are removed or returned. For instance, a scanning of a first item can indicate the item is being removed and a second scan of the same item can indicate the item is being returned. It is to be appreciated that each item can include a marking component as an identifier to allow tracking of the quantity of each item housed within the storage container. In another embodiment, a device (discussed below) can be used to track removal or return of an item.

In another embodiment, the system 100 can utilize a scale system 46 that is configured to measure a weight of one or more items housed within the storage container 10 and determine whether the number of items changed based on a change in weight. For instance, a number of items can have a first weight and when one or more items are removed or returned, a new weight is detected by a scale system 46 to determine a number of items. This can be utilized in combination or in the alternative of one or more cameras to detect item removal or return.

The scale system 46 can use one or more algorithms to determine the addition or removal of items. For example, upon impulse, the scale system 46 may pause for the weight detected to remain within a threshold (e.g., not varying by more than ten (10) grams) for a preset time (e.g., for three (3) seconds) before an inventory removed or added is calculated. In embodiments, one or more inventory items can be tracked by weight. Various tolerances and thresholds can be employed to accurately track inventory without permitting fraud or abuse. Further, as discussed elsewhere herein, weight can function as one of a multi-factor test to confirm proper inventory tracking. Inventory tracking, including multi-factor inventory tracking, need not deal exclusively with the removal of inventory, but can also confirm or verify return, replacement, or complete use or exhaustion of previously accessed inventory.

The system 100 can further include and/or work in conjunction with a wireless tracking system (not shown) such as, but not limited to, RFID, NFC, or a suitable transmitter and receiver system on each item. The wireless tracking system can be used to track each item and quantities of items housed within the storage container 10. In another example, the cameras 14 can track movement to determine whether or not an item is removed or replaced/returned. Based on the tracked movements, the controller component 15 can manage an inventory within the storage container 10.

In an embodiment, the controller component 15 monitors an amount of the items based on at least one of the scanner 16 and/or recorded media from cameras 14. Additionally, the controller component 15 stores at least one of the portion of data, the scan, the recorded media, and/or any other suitable data from the system 100 to a data store.

It is to be appreciated that the detail of tracking inventory items from the storage container 10 can be any suitable level based on use of the scanner 16, scale system 46, motion sensors, among others. The described storage container 10 can be employed with one or more of the described features in order to tailor to a particular environment. For instance, the system can be employed with cameras when the environment or management of the environment is not concerned with tracking each amount of each item stored in the storage container 10 (e.g., user behavior is influenced by awareness of being recorded). In another embodiment, a camera tracking system can include the scanner 16 as well. In another example, the scale system 46 can be used in combination or in the alternative of the scanner 16. For instance, an environment that includes items that are difficult to track due to size (e.g., small in size) can leverage cameras 14, as well as, the a scale system 46 rather than the scanner 16 (e.g., scanning small items can be difficult due to size).

As alluded, a variety of techniques can be employed to track inventory within the system 100. In order to more accurately track inventory present, added, or removed, inventory can be marked in one or more ways facilitating accurate identification. Accurate identification can include a multi-factor test applied based on activity related to the container 10 (e.g., weight on scale reduced or increased, motion sensed, and others). For example, a blue pen or even a pencil can be accidentally replaced or bumped into the area designated for red pens. In this example, the weight of a blue pen or pencil being added to the red pens will result in an inaccurate inventory for both the red pens and the blue pens or pencils. Such activity may thwart highly accurate inventory management.

In an embodiment, the system 100 can utilize a marking component (not shown) as an identifier. Marking can include any combination of stickers, tags, bands, and other attachments or treatments. Such marking can relate to color coding, defining reflective portions, defining portions having a known infrared signature, including different patterns, including magnetic portions, and so forth. Various machine vision techniques can be employed alone or in combination with scanners (e.g., scanner 16) or sensors (e.g., detectors used in combination with RFID technology, magnets, light intensity, and so forth) to accurately identify specific inventory items.

Additional means for identifying the removal or replacement of particular items can include inventory holder 48. Inventory holder 48 can be a standalone device or integrated into one or more portions of container 10. Inventory holder 48 can include one or more mechanical or electrical means to detect the presence or absence of an item. For example, inventory holder 48 can retain a plurality of thumb drives. Based on whether a thumb drive is present, a mechanical closure may be held open, or an electrical circuit may be held open, such that removal of the thumb drive closes the apparatus or circuit, triggering a signal to indicate the thumb drive was removed. In embodiments, inventory holder 48 can be specially sized or configured to accept a specific inventory item. In alternative or complementary embodiments, inventory holder 48 can be adapted to accept a plurality of different items simultaneously or at different times.

The system 100 can include a first power source 22 and a backup power source 24 to provide power thereto. For instance, a first power source 22 can provide power to the system 100 from a main line of power, wherein a backup power source 24 can provide power as a backup system in the event power is unobtainable via the main line of power. For instance, the backup power source 24 can be, but is not limited to, a battery power source. In an embodiment, one or more of first power source 22 and/or backup power source 24 can provide surge protection to prevent damage or outages. In an embodiment, the backup power source 24 can operate as the power supply for continued extended use in the event the primary power supply (e.g., wired AC power) is interrupted in the environment around the storage container 10 (e.g., a property where storage container 10 is deployed may experience a property-wide power outage, but backup power source 24 prevents impact on operational capability of storage container 10 and/or components thereof).

Backup power source 24 also allows system 100 to be moved without interruption (e.g., powering down) of one or more electrically powered components. First power source 22 can be a primary (e.g., wired AC power) cord, and this cord may be disconnected (e.g., from a wall plug). Backup power source 24 can keep system 100 energized until first power source 22 is reconnected. First power source 22 can be reconnected in a different location after moving system 100.

In embodiments, backup power source 24 can be, at least in part, outside container 10. In alternative embodiments, backup power source 24 can be stored within container 10 (not pictured). In still additional alternative or complementary embodiments, backup power source 24 can include multiple components or sources, some of which are stored in container 10, and some of which exist outside container 10. Power cable 26 can link backup power source 24 to the power line through which first power source 22 or another power supply energizes the components of system 100.

The system 100 can further include a notification component 20 that is configured to communicate a notification or signal. The notification component can generate at least one of an audible signal, a visible signal, a haptic signal, a wireless signal to another component or device, an email notification, among others. The notification component 20 can be customized to transmit or display a signal based upon at least one of a repair needed, a maintenance needed, a duration of time lapsed, a replenishment of inventory needed, a theft, an unauthorized access, a detected tampering (e.g., shaking, force detected, among others), and the like. For instance, upon an item being below defined quantity, a signal can be communicated to replenish such item. Each time a signal is communicated or displayed from notification component 20, it can be logged into a data store.

System 100 can include a communications component 54. Communications component 54 can facilitate one or more techniques of wired or wireless data communication to transfer information for storage or analysis, transmit notifications, facilitate remote access, et cetera. In embodiments, communications component 54 can be enclosed within container 10. In alternative or complementary embodiments, communications component 54 exists, at least partially, outside container 10. In another example, communications component 54 can be substantially housed in container 10, but include an external link, such as antenna 32, external wiring, or other techniques.

The system 100 can further include a remote access to at least one of the storage container 10, the lock mechanism 18, the verification component 12, the cameras 14, the controller component 15, the scanner 16, the power source 22, the backup power source 24, the notification component 20, the communications component 54 or a combination thereof. The remote access allows control of the system 100 from a location other than at the storage container 10. For instance, a remote access can allow control of the storage container 10 from a computer in a different physical location in comparison to the location of the storage container 10. In another embodiment, a remote access can be from one network to a second network hosting the storage container 10. It is to be appreciated that the network can be any suitable network such as, but not limited to, a wireless network, LAN, WAN, Ethernet, Wi-Fi, local, remote, cloud-based, or a combination thereof. The remote access can be utilized to manage video capture or media capture, access to the storage container 10, turn on or off components, unlock or lock the storage container 10, move or adjust cameras 14, access the scanner 16, communicate a signal from the notification component 20, among others. In another example, a remote access can be utilized to provide trouble-shooting (including, e.g. off-site trouble-shooting) to the system 100.

The system 100 can further be utilized to analyze usage, patterns, or purchases of items based on the data collected related to items removed, returned, used, consumed, among others. For instance, a number of items in the storage container can be determined to have a particular lifetime or last a specific amount of time based on historical data. Additionally, historical data can be used to determine a user that is consuming or using too much of an item. It is to be appreciated that inventory data collected can be used in various applications and is intended to be included with the subject innovation. In an embodiment, the controller component 15 is configured to provide an estimation of consumption for a plurality of items (e.g., the first item or the second item) based upon collected historical data related to removal of items from the storage container.

In an example, a user can interact with the storage container 10 with a device, wherein the interaction can be a verification (e.g., via verification component 12) or a logging of items (e.g., using a device, such as a scanner 16). It is to be appreciated that the device can be, but is not limited to being, a computer, a desktop machine, a tablet, a portable device, a portable digital assistant, a smartphone, a laptop, a computing device, a portable gaming device, a game console, a device that can access the Internet, a kiosk, a terminal, a display, a surface computing device, smart glass, a surface that interacts with a user's motion or touch, and the like.

Figure 5:
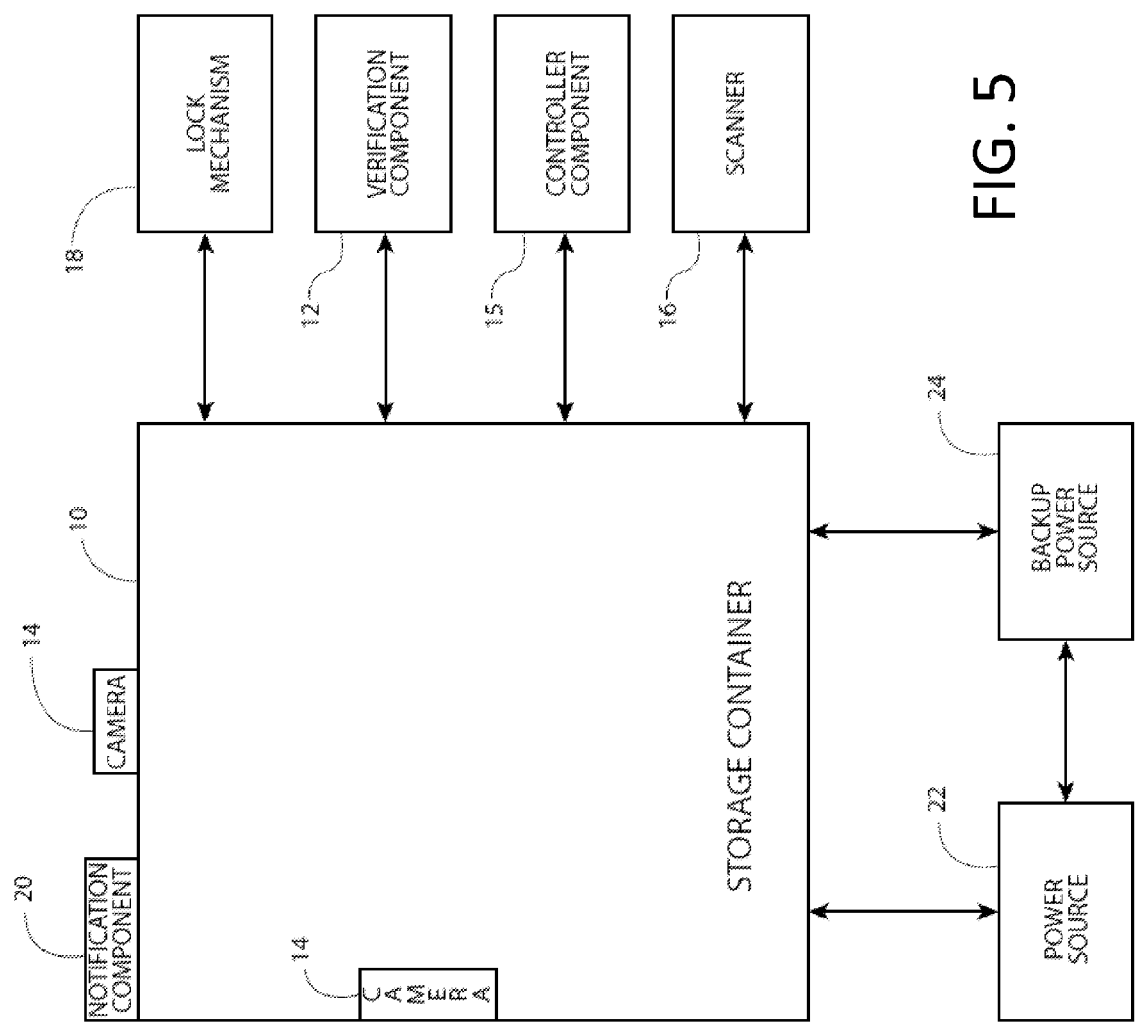
FIG. 5 is an illustration of a block diagram of a system for managing an inventory of items for an environment.

Although not depicted in FIG. 1, it is to be appreciated that, in an embodiment, the controller component 15 can be a stand-alone component (as depicted in FIG. 5), incorporated into the storage container 10, or a suitable combination thereof. Similarly, it is to be appreciated that, in an embodiment, the verification component 12 can be a stand-alone component (as depicted FIG. 5), incorporated into the storage container 10, or a suitable combination thereof. Similarly, it is to be appreciated that, in an embodiment, the lock mechanism 18 can be a stand-alone component (as depicted in FIG. 5), incorporated into the storage container 10, or a suitable combination thereof. Similarly, it is to be appreciated that, in an embodiment, the camera(s) 14 can be a stand-alone component (as depicted in FIG. 5), incorporated into the storage container 10, or a suitable combination thereof. Similarly, it is to be appreciated that, in an embodiment, the power source 22 and/or backup power source 24 can be stand-alone components (as depicted), incorporated into the storage container 10, or a suitable combination thereof. Similarly, it is to be appreciated that, in an embodiment, the notification component 20 can be a stand-alone component (as depicted in FIG. 5), incorporated into the storage container 10, or a suitable combination thereof. In various embodiments, other components (e.g., scanner 16, scale system 46, inventory holder 48, power cable 26, communication component 54) can be stand-alone components, incorporated into storage container 10, or combinations thereof.

The system 100 can store media from cameras, portions of data from users, registration data, inventory information, item data, among others in a data store. It is to be appreciated that the data store can be, for example, either volatile memory or nonvolatile memory, or can include both volatile and nonvolatile memory. The data store of the subject systems and methods is intended to comprise, without being limited to, these and other suitable types of memory. In addition, it is to be appreciated that the data store can be a server, a database, a hard drive, a flash drive, an external hard drive, a portable hard drive, a cloud-based storage, a solid-state drive, and the like. The data store can further be a local data store, a remote data store, a cloud-based data store, or a combination thereof.

Specifically shown in FIG. 3, system 100 can include display component 36 mounted to container 10. Display component 36 can display any information, including information related to container 10, its inventory, users, and other containers. In embodiments, display component 36 can display the inventory contained in summary or item-by-item. In some embodiments, display component 36 can display a status of container 10 related to its function (e.g., offline or requiring service) or its inventory (e.g., items checked out or exhausted). In the event that container 10 requires service (e.g., damaged, inventory requiring replenishment), display component 36 can display the location of nearby containers with one or more desired inventory items. Display component 36 can be couple with one or more other components (e.g., processors, memory) to receive data related to the information presented on display component 36.

In alternative or complementary embodiments, display component 36 can display information about an inventory item, user, or group of users. For example, inventory information can include information about an inventory item, its cost, its expected lifespan or usage, and others. In embodiments, a user's inventory usage can be displayed, such as the number or value of items utilized. In embodiments, display component 36 can facilitate an account system where credits or debits are tracked by user. In particular embodiments, the user can be given an inventory "allowance" where they will be prevented from accessing additional inventory items after debits exceed a threshold. Finally, users or groups of users can be displayed on display component 36 in terms of their total usage or efficiency, or comparative usage or efficiency in view of other users or groups.

Container 10 can include panels 28. In embodiments, panels 28 can be transparent or opaque. In such embodiments, panels 28 can enable viewing of at least a subset of inventory items in container 10. In alternative embodiments, one or both of panels 28 are solid, preventing view into container 10.

Closure 34 can be used to manually actuate opening or closing of container 10 once verification is complete via verification component 12.

Figure 4:
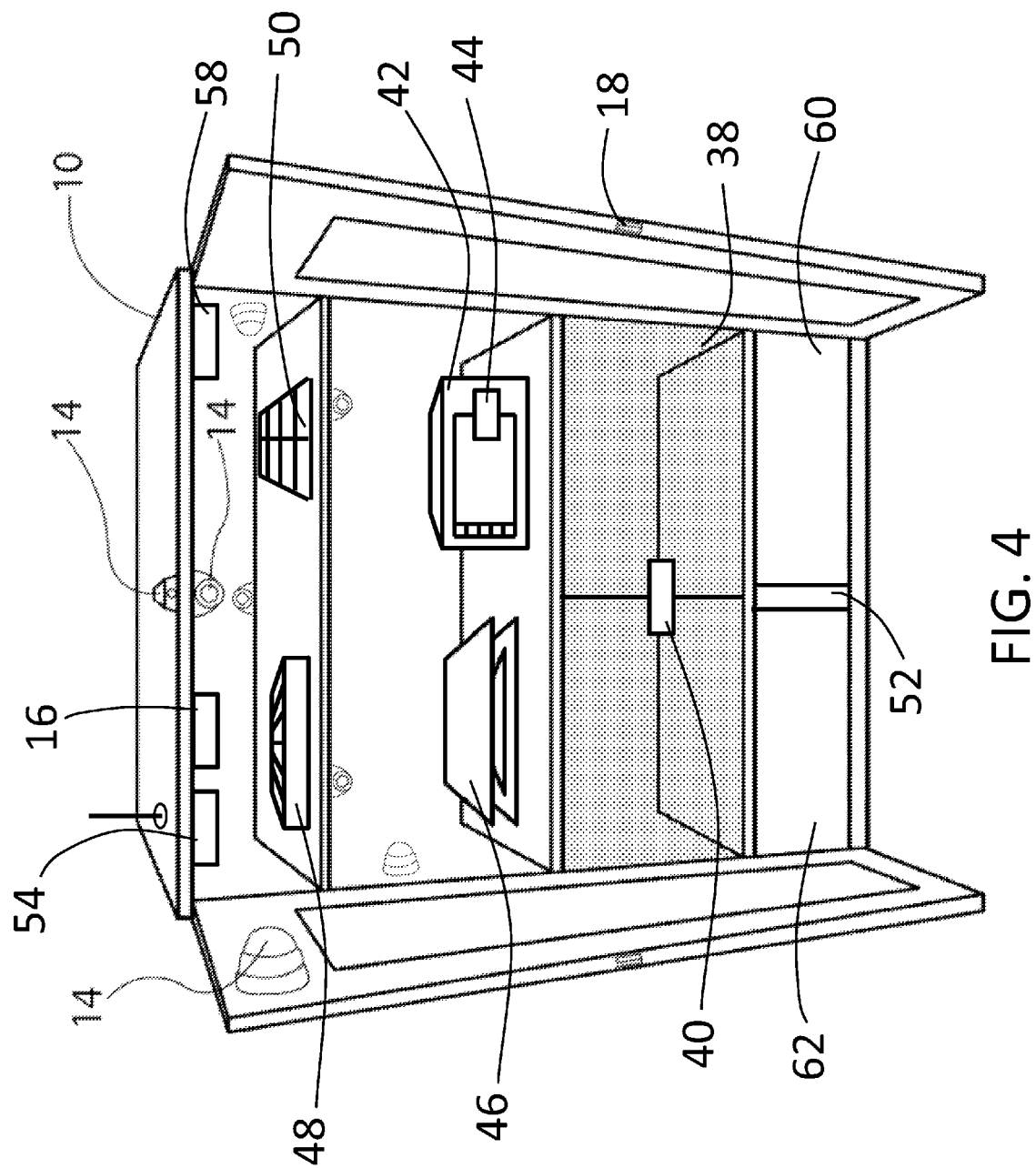
FIG. 4 is an illustration of an embodiment of a system for managing an inventory of items for an environment.

With specific reference to FIG. 4, other aspects are depicted. As shown, a plurality of cameras and motion sensors can be included without regard for their type, position, or arrangement. Container 10 may include motor component 58, which can automatically open or close one or more security features of container 10. For example, motor component 58 can open one or both doors based on a verification. Motor component 58 can be used alone or in combination with one or more camera(s) 14 (or other sensors). For example, when used with camera(s) 14, logic employing imagery from camera(s) 14 (or other sensors) can be used to prevent harm to users or damage to inventory based on opening or closing of container 10.

Container 10 may include vending component 50. Vending component 50 may, upon proper verification via verification component 12 (or other components), dispense one or more inventory items to a manual retrieval. Vending component 50 may be integrated into container 10, or may be a standalone device placed therein. For instance, the vending component 50 can automatically release an item stored in the container 10 based upon verification, authentication, and the like. For instance, the vending component 50 can include multiple items with each item secured, wherein upon authentication or verification, one of the multiple items can be automatically dispensed to a user. It is to be appreciated that the automatic dispensing of the item from the container 10 can include at least unlocking, unsecuring, releasing, delivering, or providing the item to the user.

Container 10 may include one or more security sector components 38. Security sector 38 is secured by sector locking component 40. Based on verification via verification component 12 (or other components, including manual locks), security sector 38 may be unsecured to access contents. In this regard, security sector 38 can store specific inventory items whereby a user who does not have verification credentials to access security sector 38 can still access the remainder of container 10.

Container 10 may also include security box 42 having a box locking component 44. Like sector locking component 40, box locking component 44 can be secured or unsecured based on one or both of verification information from verification component 12 or other mechanisms. Box component can be fixed or movable within container 10, and deny at least a portion of users access to contents of security box 42 while still permitting access to the remainder of container 10.

Container 10 can include single sides 60 and 62 separated by divider 52. Divider 52 prevents a user from accessing single side 60 or 62 when the door or closure covering this side is secured. For example, a verification via verification component 12 can unsecure one door or half of container 10, allowing a user to access only the permitted portions of container 10. By separating single sides 60 and 62, divider 52 denies users lacking adequate verification level from accessing one side and the inventory associated therewith.

The aforementioned systems, components, (e.g., storage container 10, camera(s) 14, verification component 12, controller component 15, scanner 16, lock mechanism 18, notification component 20, power source 22, backup power source 24, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

In an embodiment, an inventory system 100 is provided with the portion of data being at least one of a biometric data of the user, a barcode, an identification badge, a number, a code, a face detection of the user, a fingerprint of the user, or a wireless communication from the user. In an embodiment, the inventory system 100 further includes a power source 22 that supplies a portion of power to at least one of the wireless scanning device 16, the camera system 14, the controller component 15, or the lock mechanism 18. In an embodiment, the inventory system 100 further includes a backup battery power source 24 that supplies a portion of power upon the interruption of power to the power source 22.

In an embodiment, the inventory system 100 further includes a scale system 46 that measures a weight associated with at least one of the first item or the second item to determine at least one of the first amount or the second amount. In an embodiment, the inventory system 100 further includes a notification component 20 that is configured to communicate a notification based upon at least one of a service call, a maintenance, a repair, or a replenishment of the first item or the second item.

In an embodiment, the inventory system 100 further includes the wireless scanning device providing a scan of a portion of the first item or a portion of the second item to indicate a return to the storage container 10, wherein the controller component 15 is further configured to monitor the return of at least one of the first item or the second item. In an embodiment, the inventory system 100 further includes a camera system 14 that detects movement from the user to determine at least one of a removal or a return of at least one of the first item or the second item.

As described above, a first camera can focus on a user in proximity to inventory system 100. A second camera may focus on at least a first area inside the storage container. In an embodiment, the camera system 14 further includes a third camera and a fourth camera, wherein the third camera focuses on a second area inside the storage container, and the fourth camera focuses on a third area inside the storage container. Additional cameras may be provided to focus on other areas in some embodiments. In an embodiment, the controller component 15 is further configured to provide an estimation of consumption for at least one of the first item or the second item based upon collected historical data related to removal of the first item or the second item from the storage container 10.

In an embodiment, the system 100 can emit a signal in the event the door of storage container 10 remains open (or is improperly closed) for a specified duration of time (e.g., 35 seconds, among others) after being permitted to open (e.g., via verification component 12 and/or lock mechanism 18). For example, container 10 can alert via a signal in the event a user forgets to close or incorrectly closes the door to access container 10. In this example, the alert signal indicates to those in the vicinity of container 10 that the door needs to be closed.

In an embodiment, an inventory management system 100 is provided that includes at least the following: a container 10 with at least one open side; doors 30 including at least a first door that closes a first portion of the open side; a second door that closes a second portion of the open side; a locking component 18 that secures the first door and the second door; a verification component 12 that selectively unsecures and resecures at least one of the first door and the second door based on a verification input, wherein the verification input controls the locking component 18; an inventory tracking component that assesses an inventory quantity within the container; and a controller component 15 that records the inventory quantity to a database.

In the embodiment, the container can include a display component 36 that displays information related to at least one of a user associated with the verification input, the inventory quantity, the inventory management container, or a group of users, wherein the display component 36 is at least one of accessible outside the container or viewable from a user in front of the first door or the second door. In the embodiment, the container 10 can include a first power source 22 and a second power source, wherein at least one of the first power source 22 and the second power source is a battery backup 24. In the embodiment, the at least one of the first power source 22 and the second power source is enclosed within the container 10.

In the embodiment, at least one of the first door and the second door is at least partially transparent (panels 28, or other portions). In the embodiment, the container 10 can include a security sector, wherein the verification component 12 selectively unsecures and resecures the security sector based on the verification input. In the embodiment, the inventory tracking component includes a scale component 46 that ascertains an item within the container 10 based on at least a weight of the item. In the embodiment, the inventory tracking component includes an inventory holder 48 that holds an item within the container 10. In the embodiment, the inventory tracking component includes a vending component 50 that automatically dispenses an item from the container 10 to a user.

In an embodiment, a system is provided that includes at least the following: means for retaining an inventory in an enclosure; means for verifying a user requesting the inventory with a user verification; means for permitting access to the enclosure based on the user verification; means for capturing an image related to the user; means for capturing an image related to the inventory; means for determining removal of the inventory; and means for recording removal of the inventory in a data. It is to be appreciated that an enclosure is a housing that includes a volume. It is to be appreciated that any enclosure or container can be chosen with sound engineering judgment without departing from the intended scope of the subject innovation.

Figure 6:
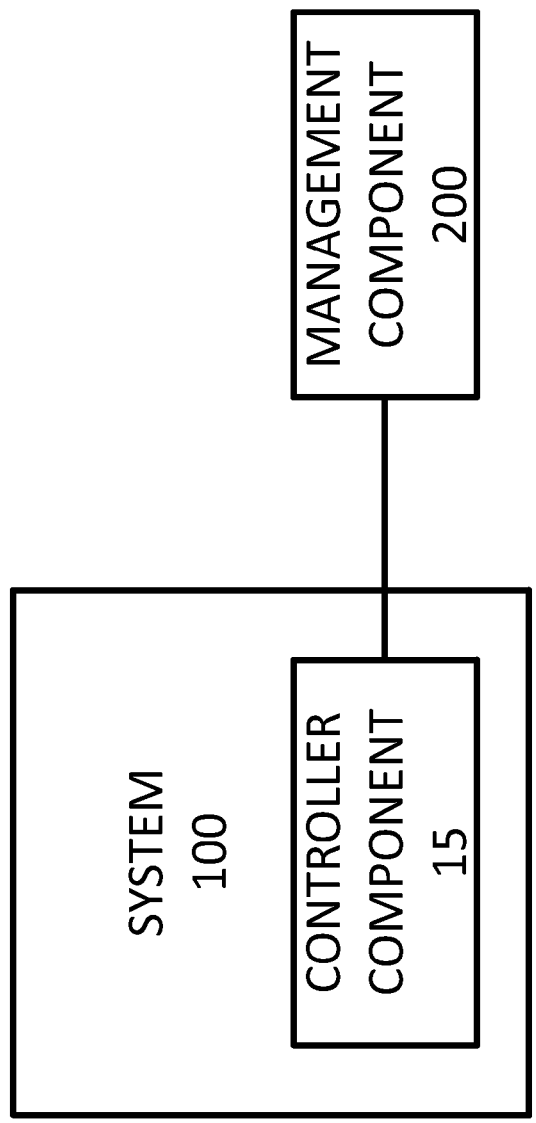
FIG. 6 is an illustration of a block diagram of components used for inventory management.

Turning to FIG. 6, illustrated is an extension of system 100 whereby a management component 200 receives information from (and, in embodiments, transmits information to) controller component 15. Specifically, management component 200 can receive inventory information, location information, user information, group information, and other data that can be used in inventory management. Management component 200 can track and forecast inventory usage, and be used to automate service or replenishment to container 10. Management component 200 can analyze container 10 and inventory utilization for a single container 10 or across an enterprise in multiple locations and with different users and/or functional groups. Management component 200 can identify trends, and flag users, locations or groups which are statistically aberrant in terms of unusually high usage, replenishment requirements, or service. Fraud or theft can be tracked. Coordination between multiple containers (e.g., container 10 and another container) in terms of ordering inventory, replenishment, service, et cetera, can be effected.

Management component 200 can track efficiency or usage by individual user or group, and provide reports related thereto. Further, users may utilize container 10 to request particular inventory not present or submit messages to personnel involved in inventory management, which can be enabled using communication between controller component 15 and management component 200.

Management component 200 can improve enterprise efficiency by reducing inventory replenishment costs. For example, in addition to forecasting and tracking usage within the enterprise, management component 200 can track and forecast pricing from inventory suppliers. Pricing trends, bulk offers, alternative suppliers, coupons, et cetera, can be tracked using network connections, and management component 200 can identify opportune times for the enterprise associated with container 10 to save costs by buying or delaying purchase of inventory. In embodiments, strike conditions can be manually set or inferred by management component 200, and purchasing can be automated using management component 200. Ultimately, resource planning related to at least the inventory stored in container 10 and associated devices can be effected using management component 200.

With reference to FIG. 7, illustrated is an example general-purpose computer 710 or computing device (e.g., desktop, laptop, server, hand-held, programmable consumer or industrial electronics, set-top box, game system, et cetera). The computer 710 includes one or more processor(s) 720, memory 730, system bus 740, mass storage 750, and one or more interface components 770. The system bus 740 communicatively couples at least the above system components. However, it is to be appreciated that in its simplest form the computer 710 can include one or more processors 720 coupled to memory 730 that execute various computer executable actions, instructions, and or components stored in memory 730.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration.

The computer 710 can include or otherwise interact with a variety of computer-readable media to implement one or more aspects of the claimed subject matter. The computer-readable media can be any available media that can be accessed by the computer 710 and includes volatile and non-volatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM), et cetera), magnetic storage devices (e.g., hard disk, floppy disk, cassettes, tape . . . ), optical disks (e.g., compact disk (CD), digital versatile disk (DVD), et cetera), and solid state devices (e.g., solid state drive (SSD), flash memory drive (e.g., card, stick, key drive, et cetera), et cetera), or any other medium which can be used to store the desired information and which can be accessed by the computer 710.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 730 and mass storage 750 are examples of computer-readable storage media. Depending on the exact configuration and type of computing device, memory 730 may be volatile (e.g., RAM), non-volatile (e.g., ROM, flash memory . . . ) or some combination of the two. By way of example, the basic input/output system (BIOS), including basic routines to transfer information between elements within the computer 710, such as during start-up, can be stored in non-volatile memory, while volatile memory can act as external cache memory to facilitate processing by the processor(s) 720, among other things.

Mass storage 750 includes removable/non-removable, volatile/non-volatile computer storage media for storage of large amounts of data relative to the memory 730. For example, mass storage 750 includes, but is not limited to, one or more devices such as a magnetic or optical disk drive, floppy disk drive, flash memory, solid-state drive, or memory stick.

Memory 730 and mass storage 750 can include, or have stored therein, operating system 760, one or more applications 762, one or more program modules 764, and data 766. The operating system 760 acts to control and allocate resources of the computer 710. Applications 762 include one or both of system and application software and can exploit management of resources by the operating system 760 through program modules 764 and data 766 stored in memory 730 and/or mass storage 750 to perform one or more actions. Accordingly, applications 762 can turn a general-purpose computer 710 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example, and not limitation, controller component 15, cameras 14, verification component 12, other components or aspects herein, or portions thereof, can be, or form part of, an application 762, and include one or more program modules 764 and data 766 stored in memory 730 and/or mass storage 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors, as well as, memory at least similar to processor(s) 720 and memory 730, among other things. Conventional processors include a minimal amount of hardware and software and rely extensively on external hardware and software. By contrast, a SOC implementation of processor is more powerful, as it embeds hardware and software therein, that enables particular functionality with minimal or no reliance on external hardware and software. For example, the controller component 15, the cameras 14, verification component 12, and/or associated functionality can be embedded within hardware in a SOC architecture.

The computer 710 also includes one or more interface components 770 that are communicatively coupled to the system bus 740 and facilitate interaction with the computer 710. By way of example, the interface component 770 can be a port (e.g., serial, parallel, PCMCIA, USB, FireWire, et cetera) or an interface card (e.g., sound, video, et cetera) or the like. In one example implementation, the interface component 770 can be embodied as a user input/output interface to enable a user to enter commands and information into the computer 710 through one or more input devices (e.g., pointing device such as a mouse, trackball, stylus, touch pad, keyboard, microphone, joystick, game pad, satellite dish, scanner, camera, other computer, et cetera). In another example implementation, the interface component 770 can be embodied as an output peripheral interface to supply output to displays (e.g., CRT, LCD, plasma . . . ), speakers, printers, and/or other computers, among other things. Still further yet, the interface component 770 can be embodied as a network interface to enable communication with other computing devices (not shown), such as over a wired or wireless communications link.

As described above, systems and methods herein include various computer hardware and software aspects. In some embodiments described above, open or closed networks between containers and associated circuits and logic can be used to integrate inventory management end-to-end through business units, locations, or entire enterprises. Information can be aggregated and shared between containers as well. Computers not directly associated with container systems can also be used to access, display, and process information generated from container systems.

In an example, iteration of an inventory activity utilizing such combined hardware and logic, a system begins by biometrically authenticating a user. Thereafter, a container of the system can be un-secured to allow users to take an item. In embodiments, a barcode scanner is provided, and the user scans a barcode on the item. The information gleaned from the barcode scanner can, in some embodiments, be corroborated by information from another sensor (e.g., scale). Alternatively, another sensor can be utilized in place of a barcode scanner. During this time, a video camera can also be recording the activity. The container can be closed and re-secured after the desired items are removed and accounted for. After the transaction is complete, or at regular intervals, information can be retrieved from the system. Retrieval of information can be performed locally or remotely, and automatically or manually with human interaction. This information can be stored in a database facilitating review and management of inventory information. The database can be leveraged by administrators and managers, as well as, supply personnel who can use system information to replenish inventory and forecast demand. Notifications can be generated and transmitted to ensure the appropriate personnel are aware when action is required (e.g., inventory low, specific item taken, fraud or abuse).

While aspects herein have generally been described in reference to management of office supplies, it is understood that systems and methods herein can be applied to other environments as well. For example, container systems herein can be used in food service, laboratory environments (including "clean rooms"), and others.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., does not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. An inventory system, comprising:
a storage container having a first shelf and a second shelf, the storage container houses a first item on the first shelf and a second item on the second shelf, wherein the first item includes a first amount and a second item includes a second amount and the first shelf is above the second shelf;
the storage container includes a first door and a second door, wherein the first door is hinged on a side of the storage container and the second door is hinged on an opposite side of the side of the storage container;
a first camera that is affixed to an exterior surface of the storage container;
a second camera that is affixed to an interior side of the first door for movement with the first door, wherein the second camera is positioned on a corner of the interior side of the first door and is focused on the first shelf, the first door having a motion limiting device for assisting the second camera to maintain focus on the first shelf;
a third camera that is affixed to an interior side of the first door or the second door for movement with the first or the second door, wherein the third camera is focused on the second shelf;
a verification component that is configured to receive a portion of data from a user to complete a verification of the user;
a lock mechanism for the storage container that secures an access to the first door and the second door based upon the verification of the user;
a motion sensor that provides a motion signal based on detected motion in proximity to the storage container;
a camera system that comprises:
the first camera focused at a position in front of the first door and the second door to capture image data of the user and activated in response to the motion signal;
the second camera focused on at least the first item on the first shelf and activated based on release of the lock mechanism and the verification of the user; and
the third camera focused on the second item on the second shelf and activated based on release of the lock mechanism and the verification of the user;
a controller component that is configured to record media from the first camera, the second camera, and the third camera upon activation based on motion or release of the lock mechanism and verification of the user;
a scanning device that provides a scan of a portion of the first item or a portion of the second item to indicate a removal from the storage container;
the controller component monitors at least one of the first amount of the first item or the second amount of the second item based on at least one of the scan or recorded media; and
the controller component stores at least one of the portion of data, the scan, or the recorded media.

2. The inventory system of claim 1, wherein the portion of data received by the verification component is at least one of a biometric data of the user, a barcode, an identification badge, a number, a code, a face detection of the user, a fingerprint of the user, or a wireless communication from the user.

3. The inventory system of claim 1, further comprising:
a scale system that measures a weight associated with at least one of the first item or the second item to determine at least one of the first amount or the second amount; and
a signal representing the at least one of the first amount or the second amount is transmitted after the weight remains stable for a preset time.

4. The inventory system of claim 1, further comprising:
a display component configured to locally display a status of the storage container, the first item, or the second item; and
a notification component that is configured to communicate a notification via a network based upon the status of the storage container, the first item, or the second item.

5. The inventory system of claim 1, further comprising:
the scanning device provides a scan of a portion of the first item or a portion of the second item to indicate a return to the storage container;
wherein the controller component is further configured to monitor the return of at least one of the first item or the second item.

6. The inventory system of claim 1, further comprising a fourth camera of the camera system, the fourth camera focuses on an area inside the storage container distinct from that of the first shelf or the second shelf.

7. The inventory system of claim 1, wherein the controller component is further configured to provide an estimation of consumption for at least one of the first item or the second item based upon collected historical data related to removal of the first item or the second item from the storage container.

8. The inventory system of claim 4, wherein the status indicates the first item is exhausted, and wherein the display component further displays an alternative location where the first item is in inventory.

9. The inventory system of claim 4, wherein the display component further displays usage patterns associated with at least one user of the storage container.

10. The inventory system of claim 1, further comprising a remote access component that provides remote control of at least one of the verification component, the lock mechanism, the camera system, the controller component, or the scanning device.

11. The inventory system of claim 1, further comprising a security sector that securely isolates the first item from the second item in the storage container, the security sector is unsecured based at least in part upon verification distinct from the portion of data from the user that allows access to the storage container.

12. The inventory system of claim 1, wherein at least one of the verification component, the lock mechanism, the controller component, or the scanning device is selectively powered based on the motion signal.

13. An inventory system, comprising:
   a storage container that houses a first item and a second item, wherein the first item includes a first amount and a second item includes a second amount;
   the storage container further includes:
      a first shelf at a first location within the storage container supporting at least the first item;
      a second shelf at a second location within the storage container supporting at least the second item; and
      a third shelf at a third location within the storage container supporting at least one of a third item, the first item, or the second item;
   a verification component that is configured to receive a code entry from a user and complete a verification of the user based on verification of the code entry;
   a lock mechanism for the storage container that secures an access thereto based upon the code entry from the user, the lock mechanism is engaged or released based at least in part on the verification;
   the storage container includes a first door and a second door, wherein the first door is hinged on a side of the storage container and the second door is hinged on an opposite side of the side of the storage container;
   a first camera that is affixed inside the storage container focused outwardly toward a location in front of the first door and the second door;
   a second camera that is affixed to an interior side of the first door for movement with the first door, wherein the second camera is positioned on a top corner of the interior side of the first door;
   a third camera that is affixed to the interior side of the first door for movement with the first door, wherein the third camera is positioned on a bottom corner of the interior side of the first door, the first door having a first motion limiting device for assisting the second camera and the third camera to maintain focus within the storage container;
   a fourth camera that is affixed to the interior side of the second door for movement with the second door, wherein the fourth camera is positioned on a corner of the interior side of the second door, the second door having a second motion limiting device for assisting the fourth camera to maintain focus within the storage container;
   an inventory control component that is configured to monitor at least one of the first amount of the first item or the second amount of the second item based on imagery collected from the first camera, the second camera, the third camera, or the fourth camera; and
   a data storage component to store at least one of imagery from the first camera, the second camera, third camera or the fourth camera.

14. The inventory system of claim 4, wherein the display component further displays information related to a shelf life of at least one of the first item or the second item.

15. The inventory system of claim 13, wherein the first camera captures imagery of the location in front of the first door and the second door after verification of the user and release of the lock mechanism.

16. The inventory system of claim 13, wherein the first shelf is fixed and positioned above and parallel to the second shelf that is fixed.

17. The inventory system of claim 13, further comprising:
   the first door and the second door are movable in a first direction to open the storage container and a second direction to close the storage container;
   the first direction is a swinging outward motion away from the storage container; and
   the second direction is a swinging inward motion toward the storage container.

18. An inventory system, comprising:
   a storage container having a non-sliding first shelf, a non-sliding second shelf, and a non-sliding third shelf, the storage container houses one or more items on the non-sliding shelves;
   the storage container includes a first door and a second door, wherein the first door is hinged on a side of the storage container and the second door is hinged on an opposite side of the side of the storage container;
   the first door and the second door are movable in a first direction to open the storage container and a second direction to close the storage container;
   the first door is rectangular-shaped and includes an interior surface and an exterior surface, wherein the first door includes a transparent portion to view the one or more items on the non-sliding shelves and a non-transparent portion on a perimeter of the first door;
   the second door is rectangular-shaped and includes an interior surface and an exterior surface, wherein the second door includes a transparent portion to view the one or more items on the non-sliding shelves and a non-transparent portion on a perimeter of the first door;
   a first camera that is affixed to an interior top-side of the storage container, wherein the first camera is focused outwardly and toward the first direction that the first door and the second door are moveable to open the storage container;
   a second camera that is affixed to an interior side of the first door for movement with the first door, wherein the second camera is positioned on the non-transparent portion of the first door and on a top corner of the interior side of the first door;
   a third camera that is affixed to an interior side of the first door for movement with the first door, wherein the third camera is positioned on the non-transparent portion of the first door and on a bottom corner of the interior side of the first door, the first door having a first motion limiting device for assisting the second camera and third camera to maintain focus within the storage container;
   a fourth camera that is affixed to an interior side of the second door for movement with the second door, wherein the fourth camera is positioned on the non-transparent portion of the second door, the second door having a second motion limiting device for assisting the fourth camera to maintain focus within the storage container;
   a controller component that is configured to activate the first camera to record an imagery based on a release of a lock mechanism and a verification of a code entry;
   the controller component is further configured to collect data to generate a notification for a service on the first camera, the second camera, the third camera, or the fourth camera of the storage container; and
   a data storage component that stores the imagery from the first camera or imagery from the second camera, third camera or the fourth camera.

19. The inventory system of claim 18, wherein the first direction is a swinging outward motion away from the storage container and the second direction is a swinging inward motion toward the storage container.

20. The inventory system of claim 18, further comprising a notification component affixed to an exterior of the storage container that is illuminated for service or by a remote access signal.

* * * * *

UNITED STATES PATENT AND TRADEMARK OFFICE
CERTIFICATE OF CORRECTION

| | | |
|---|---|---|
| PATENT NO. | : 9,098,825 B2 | Page 1 of 1 |
| APPLICATION NO. | : 14/036012 | |
| DATED | : August 4, 2015 | |
| INVENTOR(S) | : Leonard M. Bashkin | |

It is certified that error appears in the above-identified patent and that said Letters Patent is hereby corrected as shown below:

Title Page, item (73), "Assignee: Leonard Bashkin, Cleveland, OH (US)" should read --Assignee: 3 Strike, LLC Cleveland, OH (US)--

Signed and Sealed this
Seventh Day of June, 2016

Michelle K. Lee
*Director of the United States Patent and Trademark Office*